Aug. 26, 1947.  E. H. LUTZ  2,426,515
LIQUID CONGEALING APPARATUS
Filed Aug. 19, 1936  2 Sheets-Sheet 1
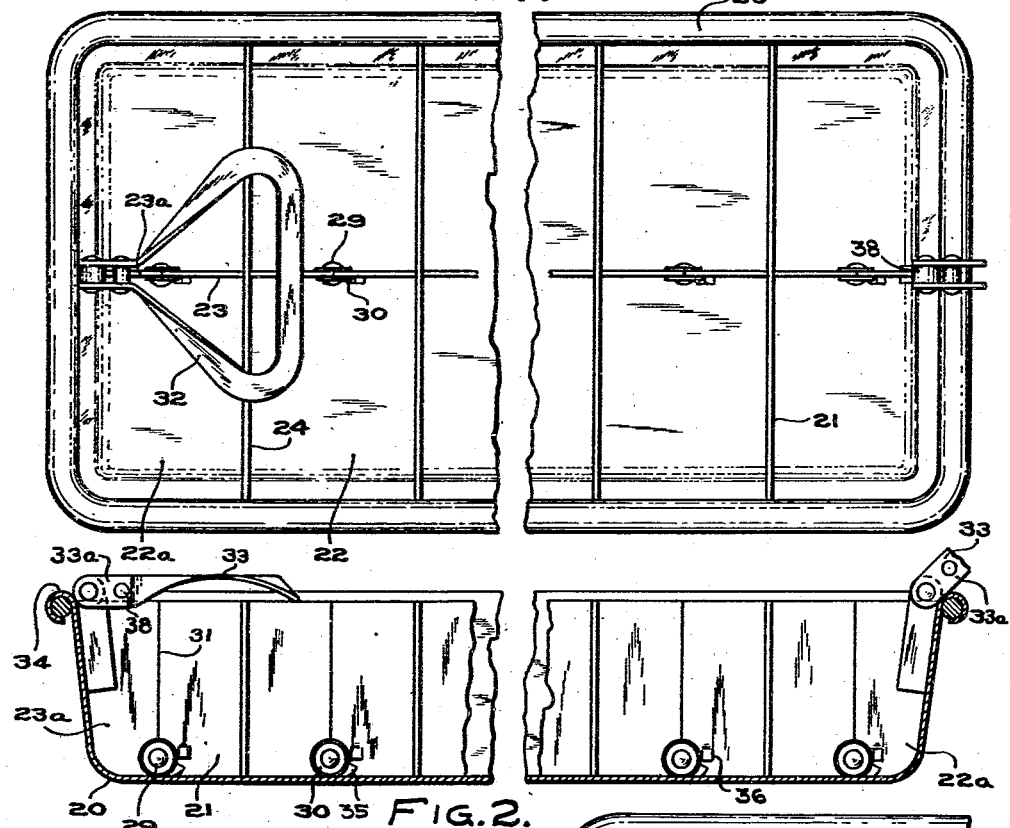
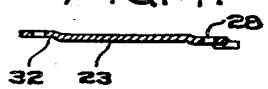
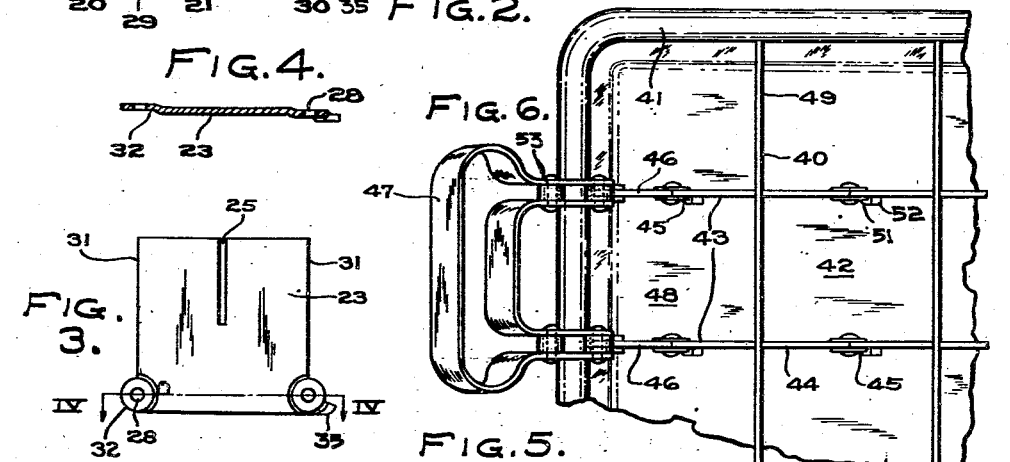
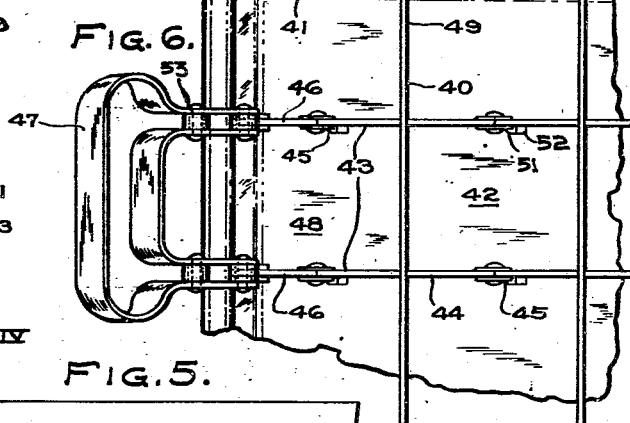
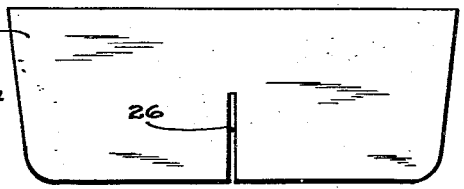
WITNESSES:
INVENTOR
EDWARD H. LUTZ.
BY
ATTORNEY Aug. 26, 1947.  E. H. LUTZ  2,426,515
LIQUID CONGEALING APPARATUS
Filed Aug. 19, 1936    2 Sheets-Sheet 2

WITNESSES:

INVENTOR
EDWARD H. LUTZ.
BY
ATTORNEY

Patented Aug. 26, 1947

2,426,515

UNITED STATES PATENT OFFICE 2,426,515

LIQUID CONGEALING APPARATUS

Edward H. Lutz, Norwood, Pa., assignor, by mesne assignments, to General Motors Corporation, a corporation of Delaware Application August 19, 1936, Serial No. 96,725

8 Claims. (Cl. 62—108.5)

My invention relates to liquid congealing apparatus and particularly to liquid congealing apparatus for use in domestic refrigerators.

It is an object of my invention to provide an improved grid structure for liquid congealing apparatus from which small amounts of frozen liquid may be removed without disturbing the remaining frozen liquid in the grid structure.

It is another object of my invention to provide an all-metal pan and grid structure in which liquids are quickly frozen because of the good heat conducting quality of metal and in which the frozen liquid is readily removable without the application of heat.

These and other objects are effected by my invention, as will be apparent from the following description and claims taken in connection with the accompanying drawings, forming a part of this application, in which:

Fig. 1 is a top plan view of liquid congealing apparatus constructed in accordance with one embodiment of my invention;

Fig. 2 is a side elevational view of the liquid congealing apparatus shown in Fig. 1, with portions of the pan member broken away for the sake of clarity;

Fig. 3 is a detail view of one of the grid sections shown in Figs. 1 and 2;

Fig. 4 is a sectional view of the grid section taken on line IV—IV of Fig. 3;

Fig. 5 is a detail face view of another of the grid sections shown in Figs. 1 and 2;

Fig. 6 is a partial view of liquid congealing apparatus constructed in accordance with a second embodiment of my invention;

Figure 7:
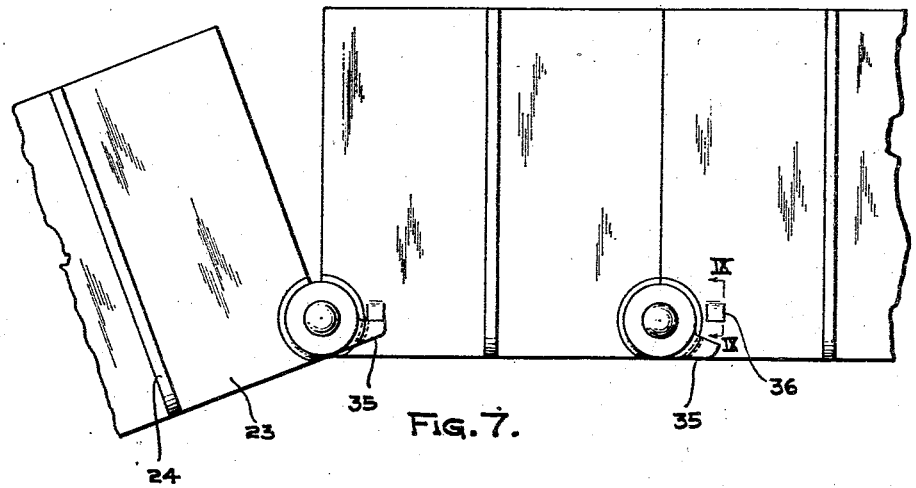
Fig. 7 is an enlarged side view of a portion of the grid shown in Figs. 1 to 5, inclusive, and illustrates the stop construction therefor.
Figure 8:
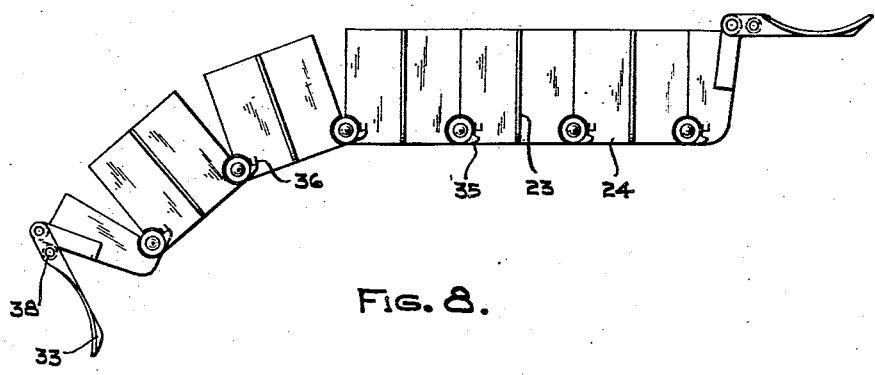
Fig. 8 is a view of the grid used in the first embodiment of my invention shown partially separated for the purpose of removing ice cubes therefrom; and, Fig. 9 is a detail view of the stop provided on the grid, taken on line IX—IX of Fig. 7.

Referring specifically to Figs. 1 to 5, inclusive, and Figs. 7 and 8, for a detailed description of the first embodiment of my invention, numeral 20 designates a relatively rigid pan member preferably formed of pressed aluminum. A removable grid member, preferably formed of aluminum and generally indicated at 21, is disposed in the pan member 20 and forms, with the pan member, a plurality of cells 22 for forming blocks of frozen liquid (not shown). The grid member 21 is formed of rigid longitudinal sections 23, as shown in detail in Figs. 3 and 4, and of rigid transverse sections 24, as shown in Fig. 5, both the sections 23 and 24 forming vertical partitions when disposed in the pan member 20. The longitudinal sections 23 are provided with slots 25 opening at the top thereof, and the transverse sections 24 are provided with slots 26 opening at the bottom thereof. The transverse and longitudinal sections are rigidly assembled by sliding the transverse section 24 over the longitudinal section 23 so that the longitudinal section 23 is inserted in the slot 26, and the transverse section 24 is inserted into the slot 25.

The longitudinal sections 23 are provided with hinge eyes 28 at both of the bottom corners thereof. The hinge eyes 28 of contiguous longitudinal sections 23 are disposed in registry, and hinge pins, herein shown as rivets 29, are inserted in the eyes 28, thus forming hinges 30. Each longitudinal section 23, with its transverse section 24 attached is, therefore, rotatable with respect to the other longitudinal sections. The vertical edges 31 of each longitudinal section 23 abut along their entire extent, except at extended outstruck portions 32 in which the hinge eyes are formed, so that rotational movement about the hinges is possible in only one direction, namely, to separate the vertical edges 31 at the extremities opposite the hinges 30.

One of the transverse wall members 24 at each end of the grid structure 21 forms end cells 22a with the end walls of the pan member 20. Two end sections 23a are hinged to adjacent longitudinal sections 23 to facilitate removal of frozen liquid from the end cells 22a.

Figure 9:

As clearly shown in Figs. 3, 7, and 8, each outstruck portion 32 of the grid sections 23 and 23a is provided with a protuberance 35 extending outwardly in the same longitudinal plane as the outstruck portion 32. The grid sections 23 and one of the end grid sections 23a, herein shown as the end grid section at the right-hand side of the drawing, are provided near the bottom left-hand corner with another outstruck portion 36 providing a downwardly-facing shoulder 37 (Fig. 9). When the grid is rotated to separate the grid sections, the protuberances 35 engage the shoulders 37, thus limiting the distance the grid sections may be rotated relative to each other to remove the cubes therefrom.

Handle means 33 are pivoted to the end sections 23a and are provided with portions 33a which engage with an upper lip 34 of the pan member 20 when the handle means 33 are rotated outwardly. The lip 34 provides a fulcrum for the handle means 33 whereby the grid member 21, with the congealed liquid therein is lifted out of the pan member 20, and the bond between the frozen liquid and the pan member 20 is broken. Since the portions of the grid member are not rotatable about the hinge means 30 in an upward direction, the entire grid member is raised an equal distance when the handle means 33 are rotated into engagement with the pan member 20, thus effecting complete breaking of the bond between the pan member and the frozen liquid therein.

After the grid member 21 with the handle means 33 and frozen liquid still attached thereto are freed of the pan member 20, the handle means may be utilized to rotate the various parts of the grid structure about the hinges 30 to impart relative movement of those parts, and thus forcibly break the bond between the frozen liquid and the grid member 21. The handle means are provided with a stop 38 which engages the ends of the grid, as shown in Fig. 8, thus limiting downward movement of the handles 33. It will be apparent, therefore, that, as force is applied to the handle means 23, only limited downward movement is effected, firstly, of the handle means 33, because of the stops 38, and, secondly, of each grid section 23 because of the protuberances 35 and shoulders 37. As successive grid sections 23 are moved relative to each other to break the bond between the frozen ice cubes in the cells 22 and the grid walls, a rigid structure is, therefore, presented, and the grid sections along the entire length of the grid may be rotated away from each other without undue movement of the handle and the grid sections from which ice has already been released. If the above-described stops were not provided, it would be necessary to rotate each grid section 180° before the next grid section 23 would be rotated, thus making it very difficult to remove the ice from the grid.

It is apparent that one, or any number of the sections 23 or 23a may be rotated about the hinges 30, until the required amount of frozen liquid is obtained from the grid 21. The frozen liquid remaining in the grid member 21 may be reinserted in the pan member 20, and the cells from which ice cubes have been removed may again be filled with liquid to be frozen.

In the embodiment of my invention shown in Fig. 6, a grid member 40, preferably formed of aluminum, divides a pan member 41 into a plurality of cells 42, which grid member is similar to the grid member 21 illustrated in Figs. 1 and 2, except that two longitudinal wall members 43 are provided instead of one. Both longitudinal wall members 43 are formed by rigid longitudinal sections 44 connected at their bottom corners by hinge means 45, corresponding to the hinge means 30 shown in Figs. 1 and 2. Rigid transverse walls 49 connect corresponding sections 44 of the longitudinal wall member 43. End sections 46 of the longitudinal walls 43 are disposed at both longitudinal extremities of the grid member 40 (only one longitudinal extremity being shown), and are provided with handle means 47 pivotally attached to two longitudinal wall sections 46 at the ends of the longitudinal walls 43 for breaking the bond between the pan member 41 and the frozen liquid. There are no transverse vertical wall members 49 associated with the end sections 46 of the longitudinal wall members 43. The end transverse wall members 49 form, with the end walls of the pan member 41, end cells 48. The sections 46 are, however, hinged to the adjacent sections 44 by hinges 45 to facilitate removal of frozen liquid from the end cells 48. The hinge means 45 are so constructed that the grid member 40 is stiff in an upward direction of the pan member, so that, when the handle means 47 are rotated to break the bond between the frozen liquid and the pan member 41, the entire grid member 40 is lifted out of the pan member to break the ice bond. Protuberances 51 and outstruck portions 52 are provided on the hinges 45 of the grid sections 44 and 46 to limit downward rotation of the grid sections in the same manner as set forth with respect to the first embodiment of my invention.

The handle means 47 may be utilized to operate the hinge means 45 to remove frozen liquid from the grid member 40, and any number of the hinge means 45 may be operated to obtain the desired amount of frozen liquid without disturbing the frozen liquid remaining in the grid member 40. The handle means 47 are also provided with stops 53 to limit their downward movement, in the same manner as the stops 38 shown in Fig. 8.

From the foregoing, it will be apparent that I have provided improved liquid congealing apparatus of the mechanical ejection type, from which small amounts of congealed liquid may be removed without disturbing the remaining congealed liquid, and from which any desired amount of frozen liquid may be readily removed without the application of heat. I have furthermore provided a hinged grid in which the movement of the various parts of the grid and operating handles is limited to effect relative movement of the entire grid structure by slight downward movement of the ends thereof.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In liquid congealing apparatus, the combination of a pan member, a detachable grid member embodying a longitudinal wall formed of grid sections, a plurality of substantially rigid transverse walls each individually connected to only one of said grid sections, said longitudinal and transverse walls providing division walls for dividing the pan into a plurality of cells, and pivot connections connecting said grid sections adjacent the bottom of the pan member for affording relative angular movement of the division walls after the grid member is raised from the pan member, said grid sections of the longitudinal wall abutting when in their normal position in said pan member for preventing relative angular movement in a direction upward of the ends of said longitudinal wall.

2. In liquid congealing apparatus, the combination of a pan member, a detachable grid member embodying a longitudinal wall formed of grid sections, a plurality of transverse walls each individually connected to only one of said grid sections, said longitudinal and transverse walls providing division walls for dividing the pan into a plurality of cells, pivot connections connecting said grid sections adjacent the bottom of the pan member for affording relative angular movement of the division walls after the grid member is raised from the pan member, said grid sections of the longitudinal wall abutting when in their normal position in said pan member for preventing relative angular movement in a direction upward of the ends of said longitudinal wall, and means for applying lifting force to the ends of the grid member to lift it out of the pan member.

3. In liquid congealing apparatus, the combination of a pan member, a detachable grid member embodying a longitudinal wall formed of grid sections, a plurality of transverse walls connected to said grid sections, said longitudinal and transverse walls providing division walls for dividing the pan into a plurality of cells, and pivot connections connecting said grid sections adjacent the bottom of the pan member for affording relative angular movement of the division walls after the grid member is raised from the pan member, said grid sections of the longitudinal wall abutting when in their normal position in said pan member for preventing relative angular movement in a direction upward of the ends of said longitudinal wall, and means for applying lifting force to the ends of the grid member to lift said grid member out of the pan member, said last means being thereafter effective to apply force downwardly of the ends of the grid member to effect relative angular movement of the grid sections.

4. In liquid congealing apparatus, the combination of a pan member, a detachable grid member embodying a longitudinal wall formed of grid sections, a plurality of transverse walls each individually connected to only one of said grid sections, said longitudinal and transverse walls providing division walls for dividing the pan into a plurality of cells, and pivot connections connecting said grid sections adjacent the bottom of the pan member for affording relative angular movement of the division walls after the grid member is raised from the pan member, said grid sections of the longitudinal wall abutting when in their normal position in said pan member to prevent relative angular movement in a direction upward of the ends of said longitudinal wall, and means for applying lifting force to the ends of the grid member to lift it out of the pan member, said last means comprising handle means rotatably attached at each end of the longitudinal grid wall.

5. In liquid congealing apparatus, the combination of a pan member, a detachable grid member embodying a longitudinal wall formed of grid sections, a plurality of transverse walls each individually fixed to and movable with one of said grid sections, said longitudinal and transverse walls providing division walls for dividing the pan into a plurality of cells, pivot connections connecting said grid sections for affording relative angular movement of the division walls after the grid member is raised from the pan member, means for applying lifting force to the ends of the grid member to lift it out of the pan member, said last means comprising handle means rotatably attached at each end of the longitudinal grid wall, and stops provided on said handle means to limit the rotation thereof in direction outwardly of the grid member.

6. In liquid congealing apparatus, the combination of a pan member, a detachable grid member embodying two laterally spaced longitudinal walls each formed of grid sections and a plurality of transverse walls each individually connected to one grid section in each of said longitudinal walls, said longitudinal and transverse walls providing division walls for dividing the pan into three rows of ice block cells, and pivot connections connecting said grid sections for affording relative angular movement of the division walls after the grid member is raised from the pan member.

7. In liquid congealing apparatus, the combination of a pan member, a grid member embodying a longitudinal wall comprising hinged sections, a plurality of angularly movable transverse walls each carried by one of said hinged sections of said longitudinal wall to provide a unitary structure for dividing the ice pan into a plurality of ice block forming cells, and means for imparting angular movement to said hinged grid sections to release the ice blocks from said grid member after said grid member is raised from said pan member.

8. In liquid congealing apparatus, the combination of a pan member, a grid member embodying a longitudinal wall comprising hinged sections formed of rigid material, a plurality of rotatably movable transverse walls also formed of rigid material and each connected solely to said longitudinal wall to provide a unitary structure for dividing the ice pan into a plurality of ice block forming cells, and means for imparting rotational movement to said hinged sections to release the ice blocks from said grid member after said grid member is raised from said pan member.

EDWARD H. LUTZ.

REFERENCES CITED

The following references are of record in the file of this patent:

UNITED STATES PATENTS

| Number | Name | Date |
| --- | --- | --- |
| 852,608 | Mathews | May 7, 1907 |
| 2,011,849 | Chilton | Aug. 20, 1935 |
| 2,025,290 | Kisselle | Dec. 24, 1935 |
| 2,037,518 | Saler | Apr. 14, 1936 |
| 2,037,519 | Saler | Apr. 14, 1936 |
| 2,043,881 | Buchanan et al. | June 9, 1936 |
| 2,266,679 | Lutz | Dec. 6, 1941 |